US006351689B1

(12) United States Patent
Carr et al.

(10) Patent No.: US 6,351,689 B1
(45) Date of Patent: Feb. 26, 2002

(54) POLLING REMOTE FUELING SITES FOR PRODUCT LEVEL INFORMATION THROUGH THE INTERNET

(75) Inventors: Fred K. Carr, Chapel Hill; Walter E. Warn, Knightdale, both of NC (US)

(73) Assignee: Progressive Int'l Electronics, Raleigh, NC (US)

( * ) Notice: Subject to any disclaimer, the term of this patent is extended or adjusted under 35 U.S.C. 154(b) by 0 days.

(21) Appl. No.: 09/612,840

(22) Filed: Jul. 10, 2000

(51) Int. Cl.[7] ................................................ G06F 17/00

(52) U.S. Cl. ........................ 700/244; 700/236; 700/241

(58) Field of Search ................................ 700/236, 239, 700/241, 244; 235/381, 375

(56) References Cited

U.S. PATENT DOCUMENTS

| | | | | | |
|---|---|---|---|---|---|
| 5,270,943 | A | * | 12/1993 | Warn | 364/479 |
| 5,400,253 | A | * | 3/1995 | O'Connor | 364/442 |
| 5,423,457 | A | * | 6/1995 | Nicholas et al. | 222/62 |
| 5,557,529 | A | * | 9/1996 | Warn et al. | 364/479.02 |
| 5,694,326 | A | * | 12/1997 | Warn et al. | 364/479.01 |
| 5,889,676 | A | * | 3/1999 | Kubo et al. | 364/479.01 |
| 5,980,090 | A | * | 11/1999 | Royal, Jr. et al. | 364/479.11 |
| 6,052,629 | A | * | 4/2000 | Leatherman et al. | 700/241 |
| 6,152,591 | A | * | 11/2000 | McCall et al. | 364/479.01 |
| 6,169,938 | B1 | * | 1/2001 | Hartsell, Jr. | 700/302 |
| 6,176,421 | B1 | * | 1/2001 | Royal, Jr. et al. | 231/381 |
| 6,193,500 | B1 | * | 2/2001 | Bradt et al. | 431/5 |
| 6,259,956 | B1 | * | 7/2001 | Myers et al. | 700/80 |

* cited by examiner

*Primary Examiner*—Christopher P. Ellis
*Assistant Examiner*—Khoi H. Tran
(74) *Attorney, Agent, or Firm*—Fred K. Carr

(57) ABSTRACT

The present invention relates to a method for gathering product level profile information from the POS of different, spaced apart fueling locations networked together to a server through the Internet. The POS monitors the dispensers through a pump control center to determine the amount of fuel dispensed and the ATG to determine the amount of product remaining in the USTs, and it tracts fuel additions to the USTs from delivery trucks. This information is stored in a data file in the POS, and is linked together along with a site identifier to form a data packet for transmission. A communication network interconnects the POS of the remote fueling sites to a server. The server maintains a first database of routing numbers for the remote sites, and a second database of product level information for each remote site. The server individually polls the remote sites to obtain the data packet. Configurators may be used to configure the logic signals from the POS into logic signals which are readable by different dispenser brands so that different dispenser types can be used in the information network.

20 Claims, 4 Drawing Sheets

POLLING REMOTE FUELING SITES FOR PRODUCT LEVEL INFORMATION THROUGH THE INTERNET

FIELD OF THE INVENTION

The present invention relates to a device and method for gathering information, and more particularly, gathering information over the Internet on fuel product levels from the Point-of-Sales system of remote, spaced apart fueling locations networked together to a server.

BACKGROUND OF THE INVENTION

The traveling public often pump motor fuel into their own vehicles at self serve fueling sites and convenience stores, there are now over one hundred fifty thousand self serve fueling sites in the US alone. Americans pump fuel into the fuel tank of their cars over seventeen billion times a year. The Environmental Protect Agency (EPA) requires that all underground storage tanks (UST) at these sites be monitored for small leaks. Through the years EPA has allowed several monthly monitoring options including: automatic tank gauging, ground water monitoring, tank interstitial wall monitoring, vapor monitoring, and statistical inventory reconciliation (SIR) of data from the fueling sites. The present disclosure relates to a method for gathering information from these remote sites over the Internet, namely, gathering fuel sales, fuel deliveries, and fuel tank levels for SIR analysis.

There are several commercial brands of fuel dispensers used in the retail petroleum industry to dispense fuel to the public. Dispensers are manufactured by different manufacturers including Gilbarco, Tokheim, Wayne Dresser, and others. The present invention discloses a method for gathering information from different dispenser brands which are often used within the fueling network of the present disclosure. USTs provide fuel to the dispensers, and they typically hold a maximum volume of 10,000 gallons. Three product grades are usually offered, therefore, three tanks are on site unless blend dispensers are used in which case there would be two tanks.

Fuel dispensers at self service fueling sites are typically controlled by a dispenser controller located in a building at the site so that the site attendant can monitor and control the dispensing process. The dispenser controller is generally a microprocessor (MP) based system with read-only-memory (ROM) and read-and-write-memory (RAM) for writing, reading, and storing information. The controller sends data signals (commands) to the dispensers including price to charge for the fuel dispensed, preset amounts of fuel to dispense, and pump authorization to dispense fuel. The dispensers likewise send data signals (responses) to the controller including pump number, pump status, and dispensed fuel volume and value.

The personal computer (PC) is particularly well suited for use as a dispenser controller since it can simultaneously perform other functions including cash register, scanning, wet and dry stock inventory, accounting, payroll, and other modules. These systems are generally referred to as Point-of-Sales (POS) systems. In the present invention, the POS at individual fueling locations is in addition connected through a communication network to a server which collects, stores, and sorts product level information at the remote fueling sites.

In the present disclosure, information on fuel sales, fuel deliveries, and existing fuel tank inventory are collected via the Internet where the server is networked to the POS system. As stated above, the POS controls the dispensers where the POS reads the dispenser totals for the requested fueling position, hose number through a pump totals command. This is a non-resettable, running total of fuel dispensed, stored in each of the dispenser. The POS is also interfaced to an ATG which measures the inches of fuel in the UST. Fuel deliveries are key into the POS by store personnel. Since the Internet communicates over phone lines for a portion of its path, this provides a menthol for electronically identifying specific fueling sites by assigning an electronic address.

U.S. Pat. Nos. 5,694,326, 5,557,529 and 5,270,943, having common inventors and assignee, relate to fuel pump control centers for controlling dispensers through the POS system. The above patents are incorporated as references into the present disclosure. The present disclosure expands on the fuel pump control center disclosure by combining the control system with the Internet to form an information gathering system for collecting product profile levels including fuel dispensed for each hose at each fueling position for each dispenser. This information is obtained from the dispensers by the POS through a fuel pump control center. The POS is further serially interfaced to an ATG for determining the amount of existing inventory in each tank. The POS accumulates this information into a data file which is later transferred over the Internet as a data packet.

U.S. Pat. No 5,423,457, issued to Michael Nicholas et al., discloses a system for detecting product lost which uses a site controller to perform SIR analysis on inventory data on site. U.S. Pat. No 5,400,253, issued to Paul O'Conner, discloses an on-site computer system which constantly collects and analyses data through a SIR formula. These references, however, do not disclose all of the elements as disclosed and used in combination in the present disclosure. The present disclosure combines the pump control technology disclosed in U.S. Pat. Nos. 326, 529, and 943 with an off-site server through the Internet for the purpose of gathering dispenser and UST information through the POS at remote sites.

SUMMARY OF THE INVENTION

In summary, the present invention provides a method for gathering product level profile information from the POS of different, spaced apart fueling locations networked together to a server through the Internet. The POS monitors the dispensers through a pump control center to determine the amount of fuel dispensed and the ATG to determine the amount of product remaining in the USTs, and it tracts fuel additions to the USTs from delivery trucks. This information is stored in a data file in the POS, and is later linked together along with a site identifier to form a data packet for transmission. A communication network interconnects the POS systems of the remote fueling sites with a server. The server maintains a searchable-selectable database of routing numbers for the remote sites, and a database of product level information for each remote site. The server polls individually the remote sites to obtain the data packets. The data packet is in digital form if delivery is over the Internet, and it may be further be encoded for protection. Configurators may further be used to configure the logic signals from the controller into signals which are readable by different dispenser brands so that different dispenser brands can be used in the network.

When a customer pulls his vehicle up to a dispenser for fuel, he selects the grade of fuel he wishes to put in his vehicle, for example, low, mid, high grades are most often offered. This information along with the method of payment for the fuel is sent to the POS and the dispenser is authorized to dispense fuel. As fuel is dispensed, the dispenser keeps a running (non-resettable) total of each product grade dispensed by fueling position and hose number. A fueling position is one side of a dispenser and the hose number identifies the product grade. The dispenser totals are later obtained by the POS through the dispenser interface module, which is part of the POS application programming.

After the sale is complete, the dispenser sends to the POS sale information including fueling position, hose number, type sale, dollar amount, and volume amount. This information can be stored and sorted in various data formats by the POS programming. One widely used data form is called a Shift Total, i.e., the amount of fuel dispensed during the employee's shift. When an employee at the site starts his shift, his shift total value is set at zero. His final shift total number is an accumulation of fuel sales during the shift.

The POS at the remote sites are further electrically interfaced to the ATGs through a serial interface. ATGs are widely used in the retail petroleum industry, and include a probe which is positioned in USTs for measuring the amount of water in the tank, the amount of product in the tank, and product temperature. The configuration of the interface between the POS and the ATG depends on the manufacturer of the probe, but generally involves a serial hardware communication device. An ATG interface module in the POS programming provides the conduit for the transfer of UST product inventory levels from the ATG to the POS.

The USTs provide feed stock to the dispensers as product is dispensed. The USTs are usually 10,000 gallon tanks which are replenished with product by delivery trucks. The ATG formulates a "delivery report" from probe information, and the driver also reports to the store manager information on the delivery. The later can be manually input into the POS. A data accumulation module in the POS programming links the above discussed UST inventory data with the dispenser totals and fuel added data to form a data packet for transfer to the server.

A negative balance between the amount delivered, the tank inventory, and the amount dispensed are evidence of a small tank leak. However, several other factors can caused negative balances when calculating inventory data including: faulty dispenser calibration, faulty ATG controller, and Improper placement of the probe in the UST. These factors can also cause a positive balance. False alarms are quite common in monitoring for small leaks. For stand alone devices, EPA standards for a system are detecting a leak of 0.2 gallon per hour with a probability of detection at least 0.95 and a probability of false detection no greater than 0.05.

In its simplest form, the server in the present disclosure would maintain a database of routing numbers for the remote fueling sites and a database for up-dating product level profile information from the remote sites. In a preferred embodiment the server transmits the gathered information to a SIR facility for analysis. Several companies in the US, including Simmons Corp in Texas, have been established for the purpose of preforming SIR analysis on product level information. Large computers at these facilities systematically analyze trends for tank inventory for various data points. In an alternate embodiment the server would include the programming for the SIR analysis.

Accordingly, the primary object of this invention is to provide a method for gathering product level profile information from remote fueling sites.

A further object of the present invention is to provide a method for gathering product level profile information from remote fueling sites using dispensers within the communication network which are manufactured by different manufacturers.

A further object of the present disclosure is to provide a method for gathering product level information where the information is transmitted as data packets.

A further object of the present invention is to provide a method for gathering product level information where the data packets are transmitted over the Internet, a cable system, or a satellite based communication system network.

BRIEF DESCRIPTION OF THE DRAWINGS

Other objects of this invention will appear in the following specification and claims, reference is made to the accompanying drawings which form a part thereof.

DETAILED DESCRIPTION OF THE INVENTION

In general, the present invention includes a server-based computer system which polls, stores and sorts databases of product level information from remote fueling sites. The server is networked to a plurality of remote, spaced apart fuel dispensing facilities, and it collects information and maintains dossiers of product amounts at each dispensing facility. The server is networked to the POS systems at each site through the Internet, and it collects information on fuel dispensed, fuel delivered, and existing tank inventory levels. A data packet is generated by the POS system by automatically linking the site identifier, flags, the fueling position, the hose number, volume, credit, and cash totals, delivery data, and ATG information into a single data stream, referred to as a data packet. The data packets are transmitted in message queues over the Internet to the server as a single, inseparable data stream.

Figure 1:
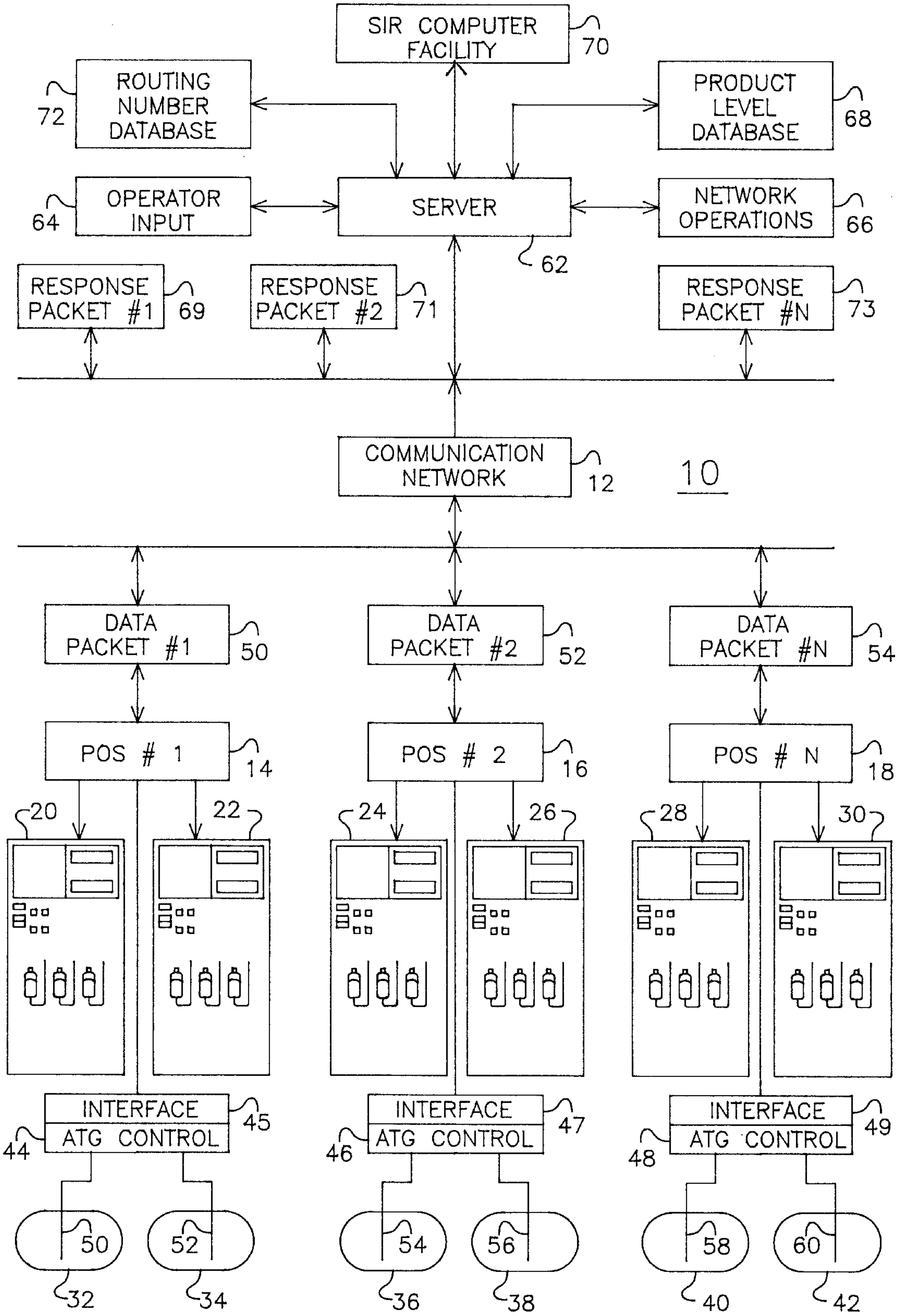
FIG. 1 is a block diagram of the hardware components of the present invention for gathering product level information from remote fueling sites.

Referring now to the drawings, and first to FIG. 1, there is shown a block diagram of the hardware arrangement for the present invention, generally designated (10). The fuel dispensers (20,22,24,26,28,30) are operationally connected to a server (62) through a communication network (12). Dispensers (20,24) are individually connected to POS (14), dispensers (24,26) are individually connected to POS (16), and dispensers (28,30) are individually connected to POS (18). The POSs (14,16,18) are connected to the server (62) through communication network (12). Each dispenser-POS combination represents a remote, spaced apart fueling facility, each having a common connection to the server (62) through communication network (12). The number of fueling sites in the network can vary from a few up to thousands, depending on the capability of the server (62).

In the illustration, the POS systems are shown as being connected to two dispensers each, however in actual practice, there are typically several dispensers at the fueling site connected to the POS. In a rural area the number of dispensers at the site may be two, at a truck stop the number may be thirty or more. The dispensers may be single product or multiple product, usually they dispense regular, mid, and premium grades. In a preferred embodiment, the communication network (12) is the Internet. Since the Internet uses phone lines for part of its communication pathway, each fueling site can be identified by an electronic address (routing number), referred to as the POS or location identifier in the present disclosure. The network connection can be continuous or intermittent on demand. As later discussed, the POS tags individual fueling positions (a side of a dispenser) and also tags the hose number (product type) at the site. Therefore, specific information can be gathered and stored by the server on a particular hose number at a particular fueling position at a particular fueling site.

The POS systems (14,16,18) are also electrically connected to the ATG systems (44,46,48) with probes (50,52, 54,56,58,60) located in the USTs (32,34,36,38,40,42), respectfully. Serial interfaces (45,47,49) provide the connection between the POS (14,16,18) and ATG (44,46,48) as more fully discussed later. ATGs are widely used in the industry to monitor product level and volume in USTs. Generally, they include a probe (50) mounted in the UST (32) with electronic connection to a central control device (44) which has a serial interface (45) to the POS (14). Probes use several methods to determine product level depending on the system manufacturer. They most often measure the amount of product, the amount of water, and the temperature of the product in the tank, factors which are used in calculating product volume. The nature of the communication between the probe and the POS varies depending on the type probe being used, but generally is a serial hardware communication device. While not shown in the illustration, there are also pipe connections between the dispensers and the USTs so that the tanks can provide feed stock to the dispensers as fuel is dispensed.

The ATGs measure the inventory level of product in the USTs. In the illustration two tanks are shown for each site. There may be three tanks at the site depending on the type dispenser being used. Blend dispensers use two tanks where mid-grade is a blend of regular and premium feed stock. Since each UST can feed several fueling positions with a product grade, each fueling location in the network site has a unique tank map specific to that site. This information is stored in memory of the server (62) so that each hose at each fueling position can be properly assigned to a specific UST.

As more fully discussed later, the POSs (14,16,18) automatically link certain data fields to form data packets (50,52,52), respectfully. These are transmitted over the communication network (12) to the server (62) at request. The data packets generally include site identifier, flags, fueling position, hose number, ATG product level information (inches of product), and fuel delivery data. This information is transmitted in a message queue in an inseparable data stream.

As stated, the server (62) is connected through a communication network (12) to remote fueling locations, in essence, different, spaced apart POS locations. The server (62) may be any type computer, for example, a stand-alone microprocessor, a server based system of PC's, or a mainframe. The server has the usual compliment of operator input interfaces (64) for inputting data, a network operators interface (66) for operations control, memory storage devices, and other I/O devices. The above constitutes a server means. Since such systems are widely used in the communication industry, they are not discussed in greater detail here. Of importance to the present disclosure is that the server (62) maintains data files of product inventory at a number of remote fueling sites, where information collected from the remote sites include product sales, product deliveries, and existing levels of product in USTs.

The server (62) maintains a routing number database (72) which contains site identifiers (routing numbers) of remote sites in the network, and a product level database (68) which stores and sorts information being transmitted in the data packets (50,52,54). These databases are searchable-selectable. The server (62) can be programmed to poll the remote fueling facilities as desired, but usually once per day. The server (62) also has a SIR computer facility interface (70) which allows the server to communicate with the facility for the transfer of information. In a preferred embodiment, the actual SIR analysis is done at a computing facility designed for this function.

The server (62) may at times need to respond back to the remote sites with certain information such as inventory flags. This is accomplished through response packets (69, 71,73). The response packets (69,71,73) are data streams created individually by the server (62) in response to particular information sorted from the product level database (68). It includes POS location, information to be displayed on the POS, and may include other information specific for the site. When the Internet is used as the communication network, the data is in digital form and may be encoded for protection.

Fuel dispensers are manufactured by several manufacturers including Gilbarco, Tokheim, Wayne Dresser, and others which are widely used in the retail petroleum industry. With the present invention, there may be from a few to thousands of fueling sites, or remote POS locations, in the communication network. It is therefore likely that different dispenser brands are present in the network. It would be advantage to be able to collect information from different dispenser brands in the network, although this is not a restriction to the present disclosure. As discussed below, configurator circuits allow different dispenser brands to be used in the network.

Figure 2:
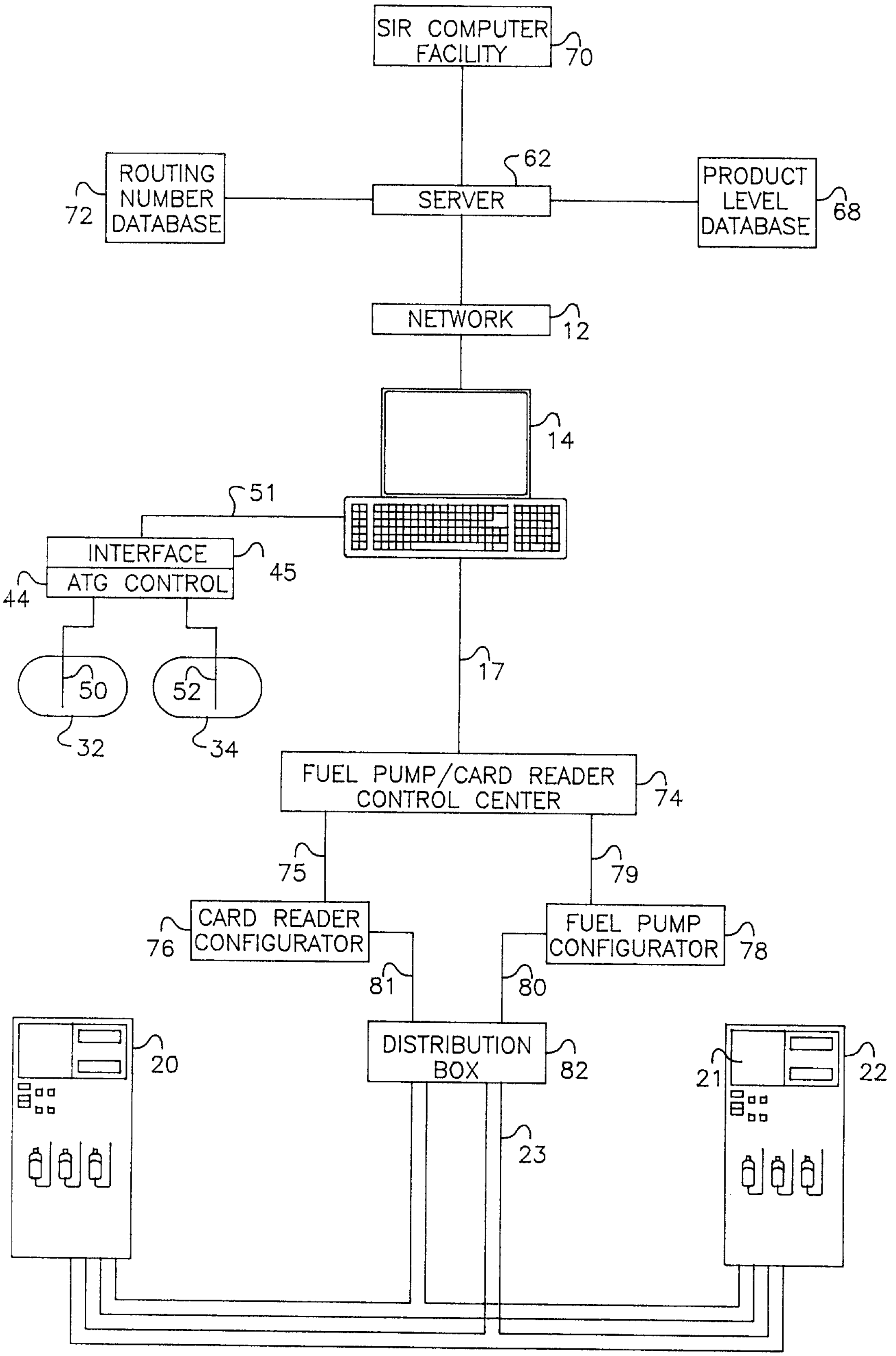
FIG. 2 is a schematic block diagram of a fuel dispensing site connected to the server showing the dispensers connected to a POS through a fuel pump/card reader control center.

Referring now to FIG. 2, there is shown a schematic overview of a fuel dispensing system which represents an individual fueling site in the communication network (10). The system includes fuel dispensers (20,22) operationally connected to a server (62) through communication network (12). The dispensers (20,22) are connected to a POS system (14) through the fuel pump-card reader control center (74), and the fuel pump configurator (78) and the card reader configurator (76). The control center (74) allows the POS computer (14) to monitor and control the dispensing process at the dispensers (20,22), and in the present disclosure, it provides a method for polling the dispensers to determine fuel sales data by fueling position and hose number. The fuel pump control center (74) is serially connected to the POS (14) through serial cable (17). Through the control center (74), the POS sends data signal commands to the dispenser (20,22), receives data signal responses from the dispensers, and can also send display data to the display unit (21). The fuel pump configurator (78), connected to the control center (74) through cable (79) and to distribution box (82) through cable (80), configure the logic signals from the controller (74) into a communication format readable by the fuel pumps in dispensers (20,22). The card reader configurator (76), connected to control center (74) through cable (75) and to distribution box (82) through cable (81), configure the logic signals from the control center (74) into a communication format readable by the card readers in the dispensers. The distribution box (82) provides a common wiring connection for the dispensers in the site communication loop.

The fuel pump-card reader control center (74) is an interface between the POS (14) and the dispenser (20,22). The control center (74) sends data signals commands to the dispensers (20,22) for controlling the dispensing process, and the dispenser (20,22) sends data signal responses to the control center (74). The information send to the dispensers (20,22) includes price per gallon to be charged for the fuel at corresponding pumps, preset amounts of fuel to be dispensed, and pump authorization. Simultaneously, signals are generated at the dispenser (20,22) for presentation to the control center (74) including pump number, pump status, and dispensed fuel volume and valve for the pump. Control center (74) also sends command signals to the card reader and the reader likewise sends responses to the control center (74).

Dispenser manufacturers use different wiring arrangements and a proprietary communication protocol for communication between their dispensers and controller. Current loop and voltage level are communication formats commonly used in the industry for pump control. The communication format used between the card readers and the controller may be current loop, RS-232, 422, or 485. Most dispenser manufacturers utilize separate data lines (23) between the control center (74) and the dispensers (20,22) and the control center (74) and card reader. While the illustrative example shows separate data lines, it is understood that the same data line can be used between the controller and fuel pumps and card readers to control both, for example, current loop can be used to control both in the same data line. A major feature of the present disclosure is that it can through configuration circuits (76,78) configure the communication protocol between the fuel control center (74) and the dispensers so that different dispenser brands can be used in the network.

The use of POS systems to control fuel dispensers is widely used in the industry. These systems generally utilize an open architectural hardware platform which includes a PC with multi-tasking operating system and POS application software programming with modules to integrate task including cash register, dispenser control, credit card processing, and scanning. The present disclosure further includes modules for ATG interface, fuel drop input interface, and a file for gathering information to be sent to the server (12). A data accumulation module gathers information from the ATG module and the fuel drop input module for placement in a data file to be transmitted to the server at request. A feature of the present disclosure is that it provides a method for gathering information from different fuel dispenser brands with POS systems having the same application software program. Data exchange between a computer, i.e. POS (14), and a peripheral device can be in a serial format using standard interfaces including RS-232, 422, and 485 format. In addition, computers typically include an expansion bus and card connectors allowing peripheral device to directly interface with the computer utilizing direct memory access. The control center (74) operates like any other peripheral device to the POS computer (14) with an external version having serial connection and an internal version with bus connection. Commands can be issued and data read using conventional operating systems including DOS, Windows, UNIX, and others. The above constitutes a POS means, which are widely used in the industry.

Reference is now made to U.S. Pat. No. 5,694,326, which is incorporated as an essential reference, having common inventors and assignee. Generally, there are a number of pump commands/responses being transmitted between the POS (14) and the dispensers (20,22) through the control center (74) and the pump configurator (78) and the card reader configurator (76). This arrangement allows the same POS application software to control different dispenser brands. Generally the following commands-responses are transmitted including authorize, sale information, stop, resume, error, status request, reset, blend, polled totals, PPU, and code download. Likewise, there are a number of commands-responses between the POS (14) and the card reader including keyboard configuration, reader status, key queue control, card queue control, key entry control, preloadable messages, beeper control, packet transfer, block storage, and display queue control. The above constitutes a fuel pump control means, and is more fully discussed in the above stated reference.

In the present disclosure, the two commands of interest are the Pump Totals Command and the Blend Command. Following is an illustrative protocol for the communication between the POS (14) and the dispensers (20,22). The protocol uses a "2's" compliment check byte. Each command and response data is transferred in a formatted frame starting with a "start of text" (ASCII STX [02]), followed by the command and data or response, followed by the "end of text" (ASCII ETX [[03]) and the check byte. All data (except the check byte) are ASCII characters. All commands are one character, the pump number is two characters, the hose number is one character. All commands are "ACKed" (ASCII 06) or NAKed (ASII 15/16), but the responses are not.

Command format:

STX CMD [Pump] [Hose][. . . Data . . . ] ETX CD

STX= ASCII 02/b 16
CMD= command code
Pump= Fueling Position
Hose= Grade Number
Data= Programming data or Action
ETX= ASII 03/16

CD= check digit

The PUMP TOTALS COMMAND 'I' is used to read the totals from a request fueling position and hose number and is as follows:

Command Format:

STX I Pump# Hose# ETX CD

Pump#= Fueling Position
Hose#= Hose Number
Flag= Totals Type

Response:

STX Pump# Hose# Flag VVVVVVV.VV XXXXXXX.XX
YYYYYYY.YY ETX CD
Pump#= Pump Number
Hose#= Hose Number
VVVVVVV.VV= Volume Totals
XXXXXXX.XX= Credit Totals
YYYYYYY.YY= Cash Totals Flag Operators:

'0'= Totals not available for this pump
'1'= Pump busy, try later
'2'= Money Totals only
'3'= Cash & Credit Totals The BLEND COMMAND 'H' is used to set the blend ratio in the pumps to adjust the product ratio.

Command Format:

STX H Pump# Hose# XXX ETX CD

Pump#= Fueling Position
Hose#= Hose Number

XXX= Percent of Hoe #1 ratio

Response

ACK/NAK Only

As previously discussed, ATGs are widely used in the retail petroleum industry to monitor product level and volume in USTs. These systems generally include a probe (50) mounted in an UST (32) with an electronic connection to a central control device (44). In the present disclosure, a serial interface (45) connects the ATG to the POS (14) through cable (51). The above constitutes a measuring means. ATG probes use several methods to determine product level depending on the manufacturer. An example of a commonly used probe includes a magnetic strip with a float which sits at the product/water interface level and a second probe which floats on the top of the fuel. ATGs generally measure the water level, the product level, and the temperature of the product, factors which are used to calculated product volume. The present invention uses product level in inches as its data unit.

The nature of the communication interface (45) between the probe (50) and the POS (14) varies depending on the type AGT being interface to. However, it generally involves a serial communication format, and the following information is transferred: date, time, tank number, flag, product level, product temperature, and water level. The data is contained in one data stream. The following steps are generally followed for polling the ATG: establish communication with ATG, send control character, receive data string, decode data string into product level, terminate communication. As previously discussed, the POS application software has a ATG interface module where the above information is stored.

The USTs at fueling sites are typically 10,000 gallon tanks which provide feed stock to the dispensers. As product is used up, it is replenished by transport trucks which add product to the tanks. Typically, the driver will "stick" the tank before he adds product, add product, and then "re-stick" the tank after the product has been added. The number of gallons added to each tank, along with stick information is given to the site manager by the driver. This information is manually entered into the POS including: date, time, tank number, number gallons added. This constitutes an input means. The ATG also formulates a "Delivery Report" which includes the following information: date, time, tank number, number gallons added, and product temperature.

The preferred communication network (12) is the Internet for transmitting the data and response packets to and from the remote POS locations. In alternate embodiments, the communication network systems are cable-based systems and satellite-based communication systems. When the Internet is used, the data is in digital form, and it may be encoded to prevent unauthorized duplication. When other communication systems are used, the data is transmitted in digital form when the system permits. The above constitute a network means, which are widely used for other applications.

The server (62) maintains a routing number database (72) and a product level database (68). The routing number database (72) contains the electronic address of the remote POS locations in the network, and is used to poll the remote locations. The number and time of the poll is determined by programming in the server (62). The product level database (68) contains up-dated information from the data packets (50,52,54) transmitted from the remote sites. The files in the product level database (68), essentially electronic dossiers of product level at individual sites, are up-dated with each poll.

A data accumulation module in the POS software accumulates data from the dispenser interface module, the ATG interface module, and the delivery report module, and stores it in a Tank.Data.File. Data packets (50,52,54) are generated from the Tank.Data.Files for transfer to the product level database (68).

As previously stated, SIR is one method allowed by EPA to monitor petroleum retail outlets for small leaks. SIR compares various data points over time to calculate a statistical trend for tank inventory; the accepted methodology is set forth in an EPA publication "Statistical Inventory Reconciliation Methods." SIR has proven over the years to be one of the more reliable methods for monitoring product levels, i.e., it has a lower incidence of false alarms. UST are by standard 10,000 gallons, but they vary in size up to five percent. While a negative balance is evidence of a leaky tank, it can also be caused by faulty dispenser calibration, faulty ATGs, ATG probe not properly positioned, and tilted tanks. Positive balances can be caused by faulty dispensed calibration, faulty ATGs, or probes not being property positioned.

Several companies have set up large computer systems designed specifically to perform SIR calculations, Simmons Corporation in Texas being an example. In a preferred embodiment of the present disclosure, information from the product level database (68) is downloaded to a SIR computer facility (70) where the SIR calculations are performed. In an alternate embodiment, SIR calculations are performed by programming in the server (62). SIR calculation formulas will be established within the guidelines set forth by above mentioned EPA publication.

Figure 3:
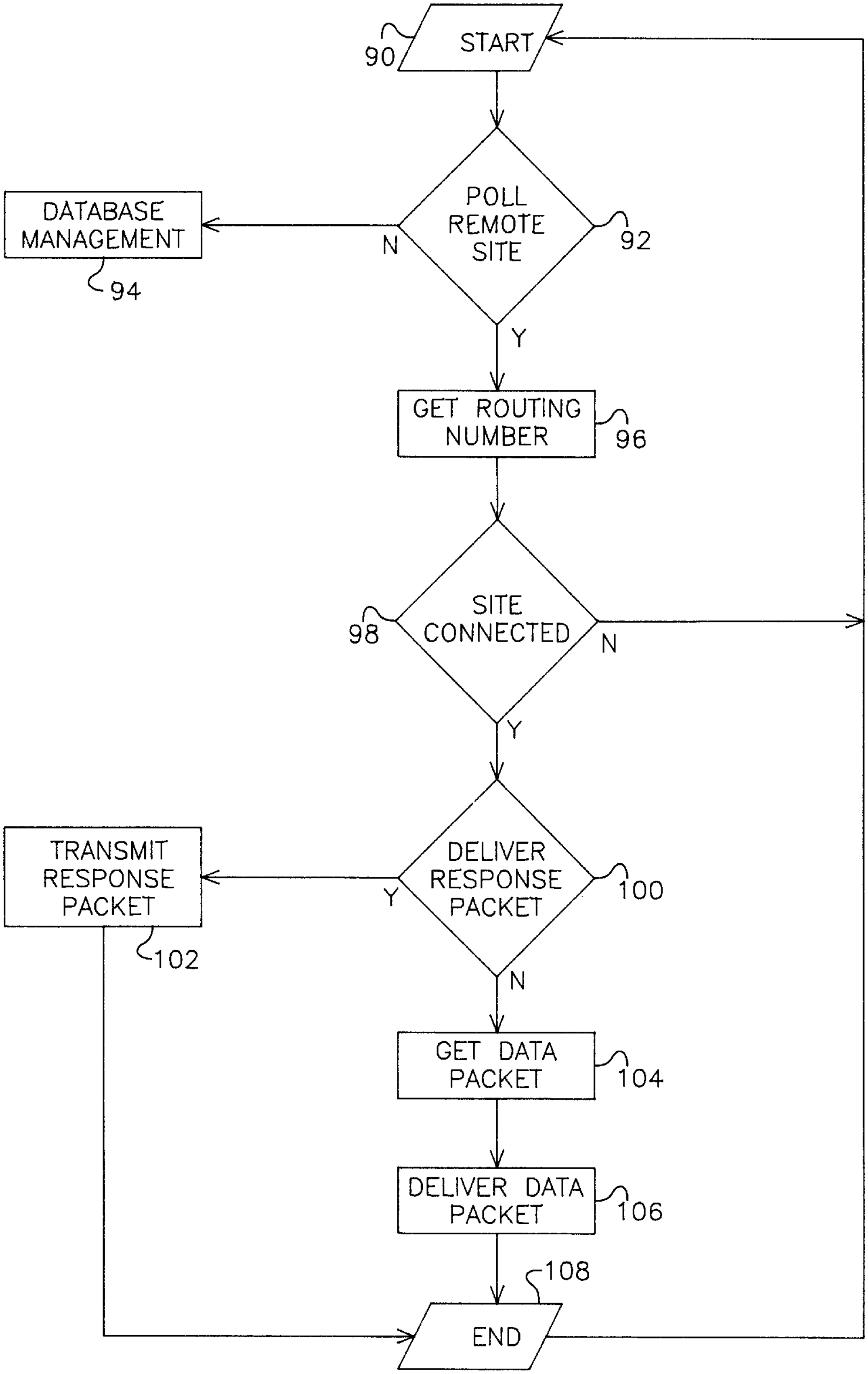
FIG. 3 is a block diagram illustrating major software blocks of the present invention for polling the remote sites and gathering the data packets.

Referring now to FIG. 3, there is shown a non-limiting flowcart of block diagrams of the programming routines for polling a remote site, delivering a response packet, or gathering a data packet. The program starts at start-initiation software block (90). At decision block (92) the program queries the immediate task at hand, is it to poll a remote or does the task involve database management? Database management is through software block (94), later discussed in FIG. 4. When the program is polling a remote site, it proceeds to software block (96) where the program gets the routing number from the routing number database (72). Decision block (96) determines when the remote site is connected. If it does not connect within a preset time limit, the routine time-outs for a retry through block (90). Decision block (100) determines if the task at hand is to deliver a response packet or to gather a data packet. Delivery of a response packet is through routine block (102) where the response packet is transmitted to the POS at the site and may include any number of flags including a leak alert, remaining inventory, billing information, and related. The response packet is a digital data stream tagged for the POS location. The system is programmed to obtain the data packet at preset times, typically once per day. The data packet, which is obtained by block (104) and transmitted by block (106), includes information from the Tank.Data.File, previously discussed. The program ends at block (108) and thereafter loops back to the start block (90).

Figure 4:
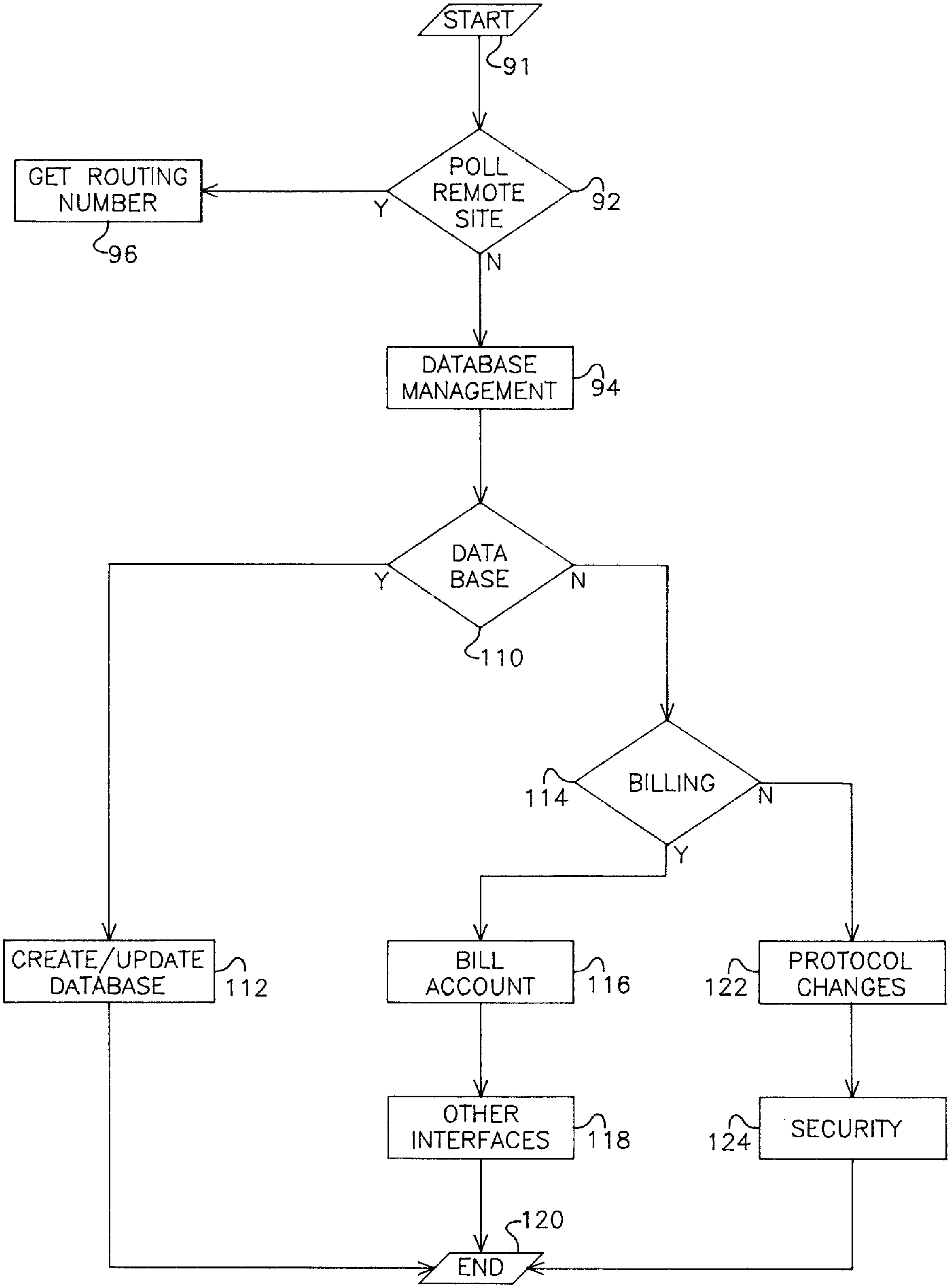
FIG. 4 is a block diagram illustrating major software blocks of the present invention for database management.

Referring now to FIG. 4, there is shown a block diagram of a flowchart illustrating database maintenance software functions performed by the server (62). Starting from the initiation software block (91), the program proceeds to decision block (92) where it queries the task to be performed. As discussed with FIG. 3, the task may be to poll a remote fueling location which is handled through the routines of software block (96), or the function may be database management where it proceeds to software block (94). Database management data may be coming from operator input (64) as seen in FIG. 1, or the data may be coming from the SIR facility. At decision block (110) the program further determines if the task at hand is to manage the databases, or if the task involves another function such as billing. If the task is database management, the program proceeds to block (112) for the creation-updating of the routing number database (72). This database contains the electronic addresses for the remote fueling sites in the network. When the task does not involve database management, the program proceeds to decision block (114) where the program determines if this is a billing task. If so, the program proceeds to block (116) where an account can be adjusted. While not an essential feature of the present disclosure, the billing subroutine provides a method for tracking and billing clients for the service provided. This could provide a method for financing the network. When a billing matter is not involved from decision block (114) the program proceeds to block (122) where system control protocol changes can be made and then to block (120) where security matters such as coding and decoding of copy is handled. The program eventually reaches the end block (120) whereby the program loops back and returns to the start block (91) for another cycle.

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An information collection system for gathering product level profile information from a plurality of different, spaced apart Point-of-Sales POS locations networked together to a server through the Internet, comprising:

(a) dispenser means for delivering a variable volumetric flow of product into a vehicle tank, functionally connected to tank means for supplying product to be dispensed;

(b) measuring means, located in said tank means, for measuring product level in said tank means;

(c) POS means functionally connected to said dispenser means, for initiating commands to said dispenser means and receiving responses from said dispenser means, and to said measuring means for receiving product level information for said tank means;

(d) fuel pump control means, operatively connected between said dispenser means and said POS means, for interfacing the two;

(e) server means, functionally connected to said POS means, for maintaining a first database containing routing numbers for said spaced apart POS locations and a second database containing product level profile information for said spaced apart POS locations; and (f) network means, operatively connecting said POS means and said server means, for transmitting information between the two.

2. An information collection system as recited in claim 1, wherein said network is the Internet.

3. An information collection system as recited in claim 1, wherein said network is a satellite based system.

4. An information collection system as recited in claim 1, further including a configuration means electrically connecting said fuel pump control means and said dispenser means, for configuring the communication protocol between the two into readable formats.

5. An information collection system as recited in claim 1, wherein said fuel pump control means includes a nonvolatile read-and-write circuit for storing operating code and a static read-and-write circuit for storing response data.

6. An information collection system as recited in claim 1, wherein said fuel pump control center includes a RS-232 serial connection to said POS means for transmitting and receiving data.

7. An information collection system for gathering product level profile information from the Point-of-Sales POS of a plurality of different, spaced apart fueling locations networked together to a server through the Internet, comprising:

(a) dispenser means for delivering a variable volumetric flow of product into a vehicle tank, functionally connected to tank means for providing product to be dispensed;

(b) measuring means, located in said tank means, for measuring product in said tank means;

(c) POS means, functionally connected to said dispenser means, for initiating commands to said dispenser means and for receiving responses from said dispenser means, and to said measuring means for receiving product level information for said tank means;

(d) fuel pump control means, operatively connected between said dispenser means and said POS means, for interfacing the two;

(e) configuration means, connected between said fuel pump control means and said dispenser means, for configuring the communication protocol of the two;

(d) server means, functionally connected to said POS means, for maintaining a first database containing routing numbers for said spaced apart fueling locations and a second database containing product level profile information for said spaced apart fueling locations; and (e) network means, operatively connecting said POS means and said server means, for transmitting information between the two.

8. An information collection system as defined in claim 7, wherein said network means is the Internet.

9. An information collection system as defined in claim 7, wherein said configuration means includes an opto-coupler with light emitting diode and transistor for translating current levels to communicate with said dispenser means.

10. An information collection system as defined in claim 7, wherein said configuration means includes an comparator for translating voltage levels to communicate with said dispenser means.

11. An information collection system as defined in claim 7, wherein said configuration means includes a RS-232 formatting circuit for formatting communication with said dispenser means.

12. An information collection system as defined in claim 7, wherein said configuration means includes a RS-422 formatting circuit for formatting communication with said dispenser means.

13. An information collection system as defined in claim 7, wherein said configuration means include a RS-485 formatting circuit for formatting communication with said dispenser means.

14. A method for gathering product level profile information from the Point-of-Sales POS of different, spaced apart fueling locations networked together with a server means, comprising the steps of:

(a) monitoring fuel dispensers by said POS at said fueling locations to determine the amount of fuel dispensed and storing the amount of fuel dispensed data in a storage device;

(b) measuring product level in the underground storage tanks USTs containing fuel to be dispensed with an automatic tank gauging ATG;

(c) monitoring said ATG in said USTs by said POS at said fueling locations to determine existing fuel levels and storing fuel level data in a storage device;

(d) monitoring fuel additions to said USTs by said POS at said fueling locations to determine amount of fuel added to said USTs and storing fuel added data in a storage device;

(e) linking said fuel dispensed data, said fuel level data, and fuel added data with a fueling location identifier to form a data packet;

(f) connecting said POS to a server through the Internet, where said server maintains a first database of routing numbers for said spaced apart fueling locations and a second database of product level profile information at individual fueling locations;

(g) causing said server to poll said POS from said routing number maintained in said routing number database; and (h) transmitting to said server said data packet where said server updates said product level profile database with transmitted data.

15. A method as recited in claim 14, further comprising the step of transmitting from said server a response packet to said POS.

16. A method as recited in claim 15, wherein said response packet includes a leak alert message.

17. A method as recited in claim 15, wherein said response packet includes product inventory information.

18. A method as recited in claim 14, further comprising the step of configuring the communication protocol between said POS and said dispenser by a configuration means for translating said communication protocol into a format readable between the two.

19. A method as recited in claim 14, further comprising the step of transmitting to a SIR computing facility information from said product level profile database for SIR analysis.

20. An information gathering system for collecting, sorting, and storing product level profile information from the Point-of-Sales POS of a pluarility of different, spaced apart fueling locations networked together, where each fueling location in the network may or may not include a different type dispenser from any other one or more of the other fueling locations, comprising:

(a) dispenser means for delivering a variable volumetric flow of product into a vehicle tank, functionally connected to tank means for supplying product to be dispensed;

(b) measuring means, located in said tank means, for measuring product level in said tank means;

(c) recording means for recording amount of product added to said tank means;

(d) POS means functionally connected to said dispenser means, for initiating commands to said dispenser means and receiving responses from said dispenser means, and to said measuring means for receiving product level information for said tank means;

(e) fuel pump control means, operatively connected between said dispenser means and said POS means, for interfacing the two;

(f) configuration means, connected between said dispenser means and said fuel pump control center, for configuring the communication protocol or the two;

(g) server means, functionally connected to said POS means, for maintaining a first database containing routing numbers for said spaced apart fueling locations and a second database containing product level profile information for said spaced apart fueling locations;

(h) network means, operatively connecting said POS means to said server means, for transmitting information between the two.

* * * * *